(No Model.)
F. KUMMER.
TRICYCLE.
No. 598,322. Patented Feb. 1, 1898.
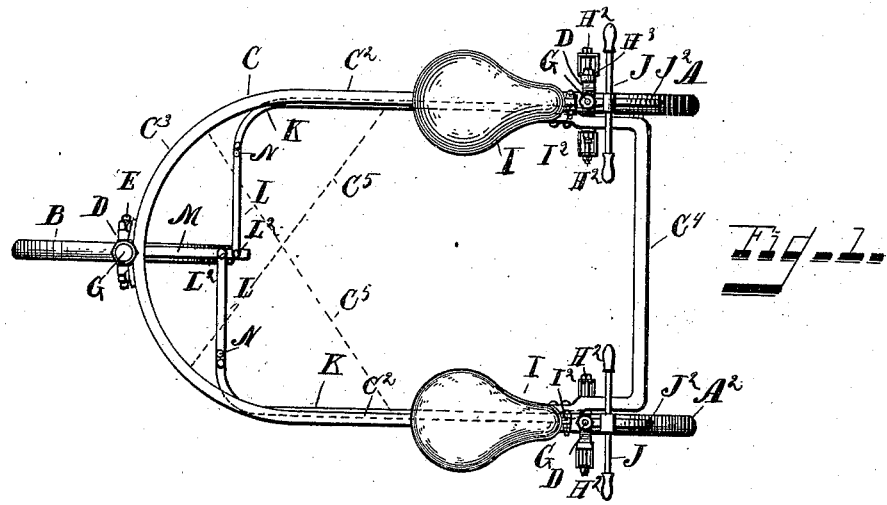
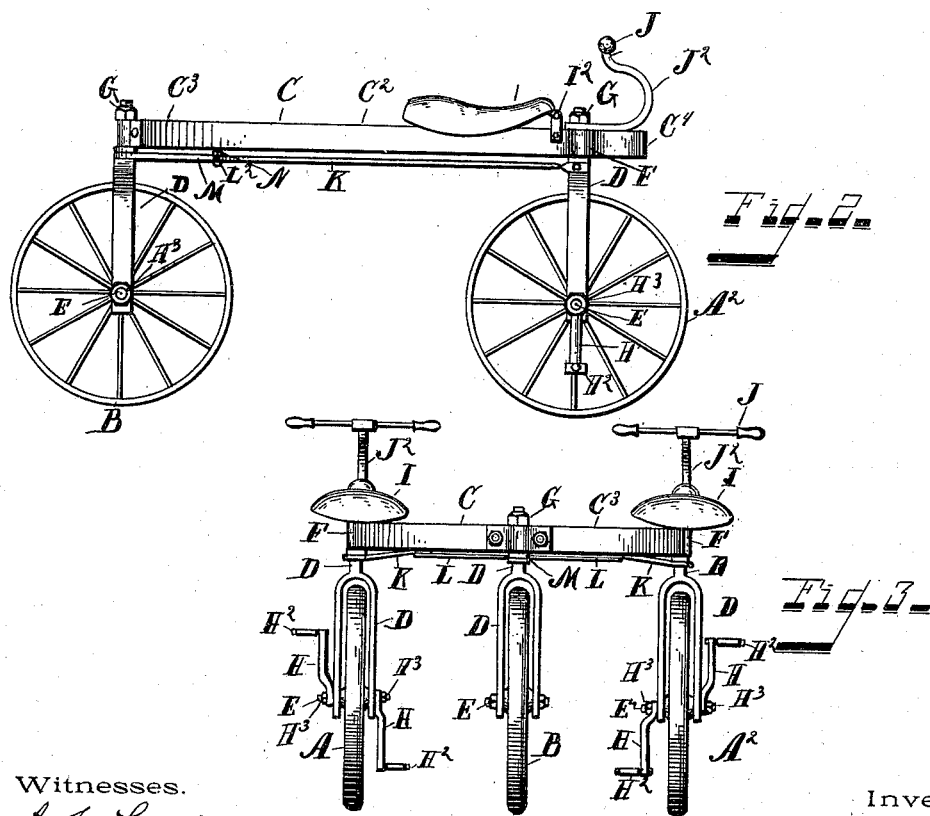
Witnesses.
A. S. Ludlow
K. Smith
Inventor.
Frank Kummer

United States Patent Office.

FRANK KUMMER, OF CINCINNATI, OHIO.

TRICYCLE.

SPECIFICATION forming part of Letters Patent No. 598,322, dated February 1, 1898.

Application filed August 10, 1896. Serial No. 602,222. (No model.)

*To all whom it may concern:*

Be it known that I, FRANK KUMMER, a citizen of the United States, and a resident of the city of Cincinnati, in the county of Hamilton and State of Ohio, have invented certain new and useful Improvements in Tricycles, of which the following is a specification.

The several features of my invention and the various advantages resulting from their use, conjointly or otherwise, will be apparent from the following description and claims.

In the accompanying drawings, making a part of this specification and in which similar letters of reference indicate corresponding parts, Figure 1 is a top view of a tricycle embodying my invention. Fig. 2 is a side elevation thereof. Fig. 3 is a rear elevation of the same.

A indicates one, and $A^2$ the other, of the forward wheels. These wheels are abreast.

B indicates the rear wheel, preferably located in the longitudinal middle of the machine.

C indicates a supporting-frame, substantially rigid and connecting the forward wheels and the rear wheel. This frame preferably consists of two parallel side pieces $C^2$ $C^2$, a curved rear portion $C^3$, and a front connecting rod or brace $C^4$, connecting the front ends of the pieces $C^2$ $C^2$ together. When desired, the pieces $C^2$ $C^2$ and the rear part $C^3$ may be connected by braces other than $C^4$—as, for example, by rods $C^5$ $C^5$. (Indicated in dotted lines in Fig. 1.) In such case the front connecting-brace $C^4$ may be omitted. The latter construction affords more room in front and in the neighborhood of the forward wheels.

Each of the wheels is pivotally connected to the frame, so that its axle can turn independently of the turning of the frame. To this end each wheel has its own bifurcated piece D. The lower or free ends of the fork are duly connected to the axle E of the wheel. The upper end of the piece D passes up through an eye or journal-bearing F of the frame C, and the frame is prevented from jumping or slipping off the piece D by means of a suitable detent G. In the present illustrative instance this detent is a nut screwed onto the screw-threaded end of the piece D above the frame. The motor-power, as in the illustrative device, is preferably attached and constructed as shown, viz: Each of the forward wheels is turned by crank H and pedal $H^2$. The cranks H of the adjacent wheel are fixed to the hub of the wheel and will be held in place by a nut $H^3$ or other suitable well-known device. In order to afford the fullest opportunity for the communication of force to the tricycle, each of the forward wheels is provided with two of these cranks H, one on each side of the wheel.

As this tricycle is primarily designed for two riders riding simultaneously I provide a seat I over or in the vicinity of each forward wheel, and this seat is supported from and by the frame. In the present illustrative instance the seat is supported on a seat-iron $I^2$, secured to the frame.

Each forward wheel can be turned (rotated on the axis of its forked piece) by means of the handle J, attached thereto by an arm $J^2$.

I have provided a novel and exceedingly advantageous device whereby this tricycle can be turned in an exceedingly short area, and this construction is as follows: From the shank of the piece D a lever K extends rearward. This lever is rigidly connected to piece D. A connecting-rod L is present, and one end of it is connected to the free end of lever K, and the other end of it is pivotally connected at $L^2$ to the free end of a lever M. The other end of this lever M is connected to the shank of piece D of the rear wheel. The relative proportionate lengths of these leverage connections are in my most preferred construction as follows: When the parts of the machine are relatively placed, as in Fig. 1, from a line drawn in theory across the machine through the shank of either of the pieces D of the forward wheels, on the one hand, to a cross-line passing from the pivot at $L^2$ parallel to the first-named horizontal line the distance is as twelve, and the distance from the pivot $L^2$ to the shank of piece D of the rear wheel is as six. This proportion between the levers causes the rear wheel to make a three-quarter turn when the forward wheel makes a half-turn, and all turns in the like proportion. Both of the shanks D of the forward wheels are likewise provided with the lever K and its attendant rod L, pivoted to the lever M, as described and as shown. Such a construction enables the rider or riders to turn the tricycle with great ease and in an extraordinarily small compass. The proportion of the levers may be somewhat varied from the above scale, though the latter is a preferred one. The arm $J^2$ of handle J is preferably bent forward, substantially as shown, and the handle located in farther forward than the shank D that the rider may have more room for his body and for the use of his arms in handling the machine.

Two riders will usually be present, each occupying one of the seats I.

Any turn of the handle of one forward wheel operates to turn the handle of the other forward wheel, as both front wheels turn simultaneously and continue always parallel, the rear wheel turning its proportionate and increased amount, as heretofore indicated.

The entire construction and arrangement is not only novel and attractive, but exceedingly advantageous and convenient. The pleasure it affords in providing for two persons riding side by side is a marked and desirable one.

As a means for limiting the movement of the lever M and with it the rods L in their movement to the right or left the rods L may be provided with a stop N, which, on coming into contact with an adjacent portion of the frame, will limit the farther movement of the lever M in that direction.

What I claim as new and of my invention, and desire to secure by Letters Patent, is—

1. A tricycle, whose three wheels are all pivotally connected to the frame, and interconnected by the levers K, one from each shank D of said wheels A, $A^2$, and a lever from the single wheel B, and the link-rods, pivotally connecting the latter to the respective free ends of the levers K, substantially as and for the purposes specified.

2. A tricycle, whose three wheels are pivotally connected to the frame, and the interconnecting gear, consisting of a lever M from the wheel B extending toward the other wheels A, $A^2$, and the connecting-rods L, and the long levers respectively fixed to the part that turns either of the latter wheels, these long levers extending toward the axial plane of the single wheel, the connecting-rods being pivotally connected to the free end of the first-named lever M and respectively to the free ends of the long levers, the long levers L bearing the proportion in length to the short lever M of two to one, substantially as and for the purposes specified.

3. In a tricycle, the combination of the frame having the sides $C^2$, and the rear portion $C^3$, and the forward wheels pivoted by shank D to the frame, and each provided with cranks and pedals, and with operating-handle, and each having the long lever L fixed to its adjacent shank D, and the rear wheel pivoted to the rear portion $C^3$ and the short lever M extending forward and fixed at its rear end to the pivot-shank portion of the rear wheel, and the connecting-rods L, one connecting the free end of one long lever to the free end of the short lever M, and the other rod L, connecting the other long lever likewise to the short lever M, substantially as and for the purposes specified.

4. In a tricycle, the combination of the frame having the sides $C^2$, and the curved rear portion $C^3$, and the forward wheels pivoted by shank D to the frame, and each provided with cranks and pedals, and with operating-handle, and each having the long lever L fixed to its adjacent shank D, and the rear wheel pivoted to the curved rear portion $C^3$ and the short lever M extending forward, and fixed at its rear end to the pivot-shank portion of the rear wheel, and the connecting-rods L, one connecting the free end of one long lever to the free end of the short lever M, and the other rod L connecting the other long lever likewise to the short lever M, substantially as and for the purposes specified.

5. In a tricycle, the combination of the frame having the sides $C^2$, and the rear portion $C^3$, and the forward wheels pivoted by shank D to the frame, and each provided with cranks and pedals and with operating-handle, and each having the long lever L fixed to its adjacent shank D, and the rear wheel pivoted to the rear portion $C^3$ and the short lever M extending forward and fixed at its rear end to the pivot-shank portion of the rear wheel, and the connecting-rods L, one connecting the free end of one long lever to the free end of the short lever M, and the other rod L, connecting the other long lever likewise to the short lever M, and the stops for preventing the lever M from turning too far to the right or left, substantially as and for the purposes specified.

6. In a tricycle, the combination of the frame having the sides $C^2$, and the rear portion $C^3$, and the forward wheels pivoted by shank D to the frame, and each provided with cranks and pedals and with operating-handle, and each having the long lever L fixed to its adjacent shank D, and the rear wheel pivoted to the rear portion $C^3$ and the short lever M extending forward, and fixed at its rear end to the pivot-shank portion of the rear wheel, and the connecting-rods L, one connecting the free end of one long lever to the free end of the short lever M, and the other rod L, connecting the other long lever likewise to the short, lever M, and the stops N, respectively located on the rods L, substantially as and for the purposes specified.

FRANK KUMMER.

Attest:
  A. S. LUDLOW,
  K. SMITH.